(12) United States Patent
Fujishita

(10) Patent No.: US 9,363,393 B2
(45) Date of Patent: Jun. 7, 2016

(54) CONVERSION DEVICE CONFIGURED TO SEND CONVERSION DEVICE ACCESS INFORMATION TO INFORMATION PROCESSING DEVICE IN ORDER TO CAUSE INFORMATION PROCESSING DEVICE TO RECEIVE CONVERTED DATA

(71) Applicant: BROTHER KOGYO KABUSHIKI KAISHA, Nagoya-shi, Aichi-ken (JP)

(72) Inventor: Masahiro Fujishita, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/552,892

(22) Filed: Nov. 25, 2014

(65) Prior Publication Data
US 2015/0146263 A1 May 28, 2015

(30) Foreign Application Priority Data

Nov. 26, 2013 (JP) ................................. 2013-243873

(51) Int. Cl.
*H04N 1/413* (2006.01)
*H04N 1/00* (2006.01)
*H04N 1/32* (2006.01)

(52) U.S. Cl.
CPC ....... *H04N 1/00244* (2013.01); *H04N 1/00225* (2013.01); *H04N 1/32117* (2013.01); *H04N 2201/0065* (2013.01); *H04N 2201/0081* (2013.01); *H04N 2201/0094* (2013.01); *H04N 2201/3249* (2013.01)

(58) Field of Classification Search
None
See application file for complete search history.

(56) References Cited

U.S. PATENT DOCUMENTS

| 6,938,202 B1* | 8/2005 | Matsubayashi et al. ...... 715/234 |
| 7,703,013 B1* | 4/2010 | Bauermeister et al. ....... 715/255 |
| 2004/0088378 A1* | 5/2004 | Moats ........................... 709/219 |
| 2008/0028307 A1* | 1/2008 | Oh ................................ 715/274 |
| 2009/0089811 A1* | 4/2009 | Ferlitsch ....................... 719/321 |
| 2013/0163017 A1* | 6/2013 | Matsuda .............. H04N 1/0023 358/1.13 |

FOREIGN PATENT DOCUMENTS

JP 2008-229993 A 10/2008

* cited by examiner

*Primary Examiner* — Thomas D Lee
(74) *Attorney, Agent, or Firm* — Merchant & Gould P.C.

(57) ABSTRACT

A conversion device may be configured to communicate with an image processing device, a first information processing device, and a second information processing device. The conversion device may receive first data, and store the received first data in a memory. The conversion device may send conversion device access information to the first information processing device, the second information processing device, or the image processing device. The conversion device access information may be to be used for accessing the conversion device, and may be sent so that message information including the conversion device access information is to be sent to the first information processing device directly from the conversion device, or through a relay of the second information processing device. The conversion device may send second data to the first information processing device. The second data may be converted from the first data.

20 Claims, 11 Drawing Sheets

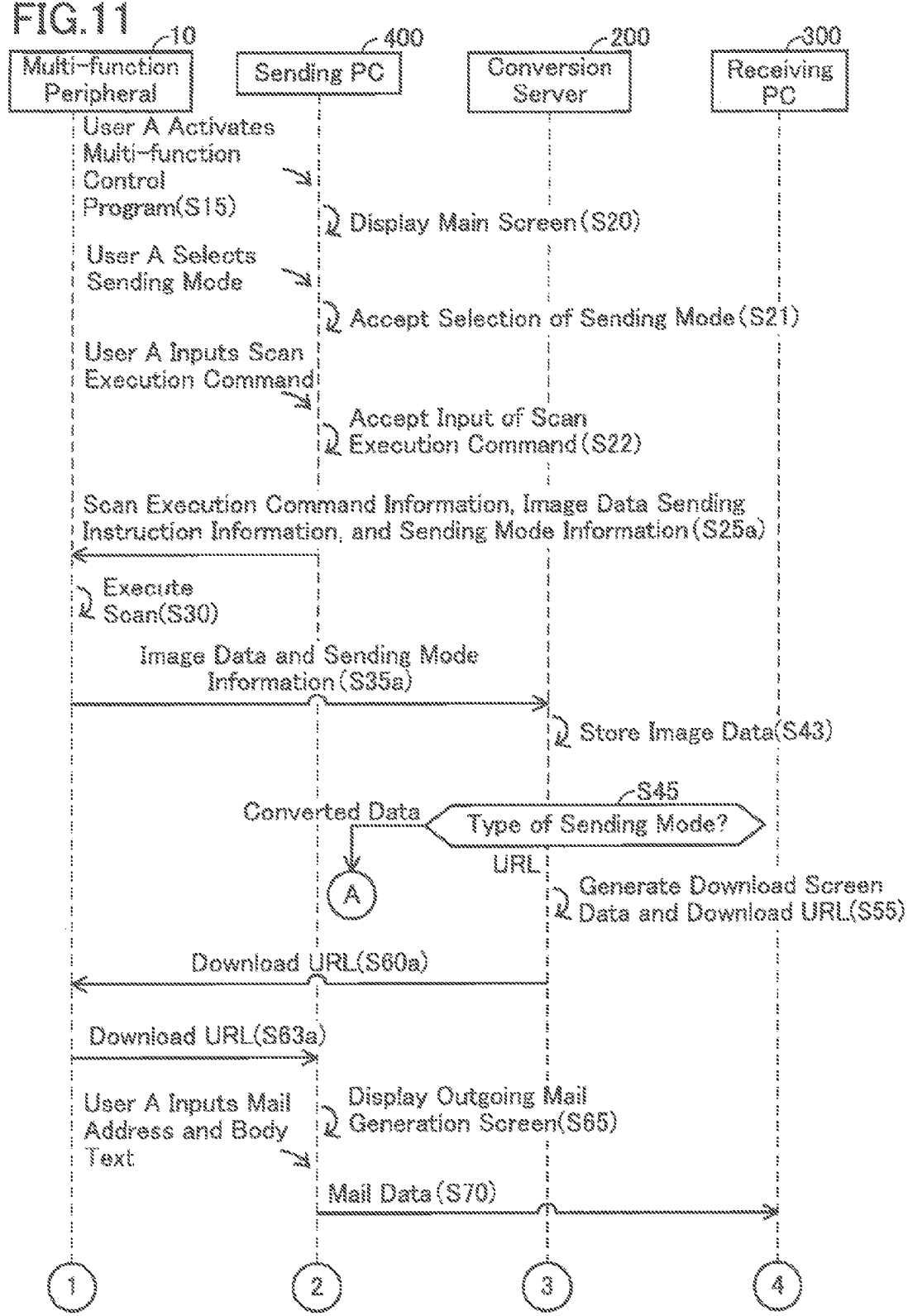

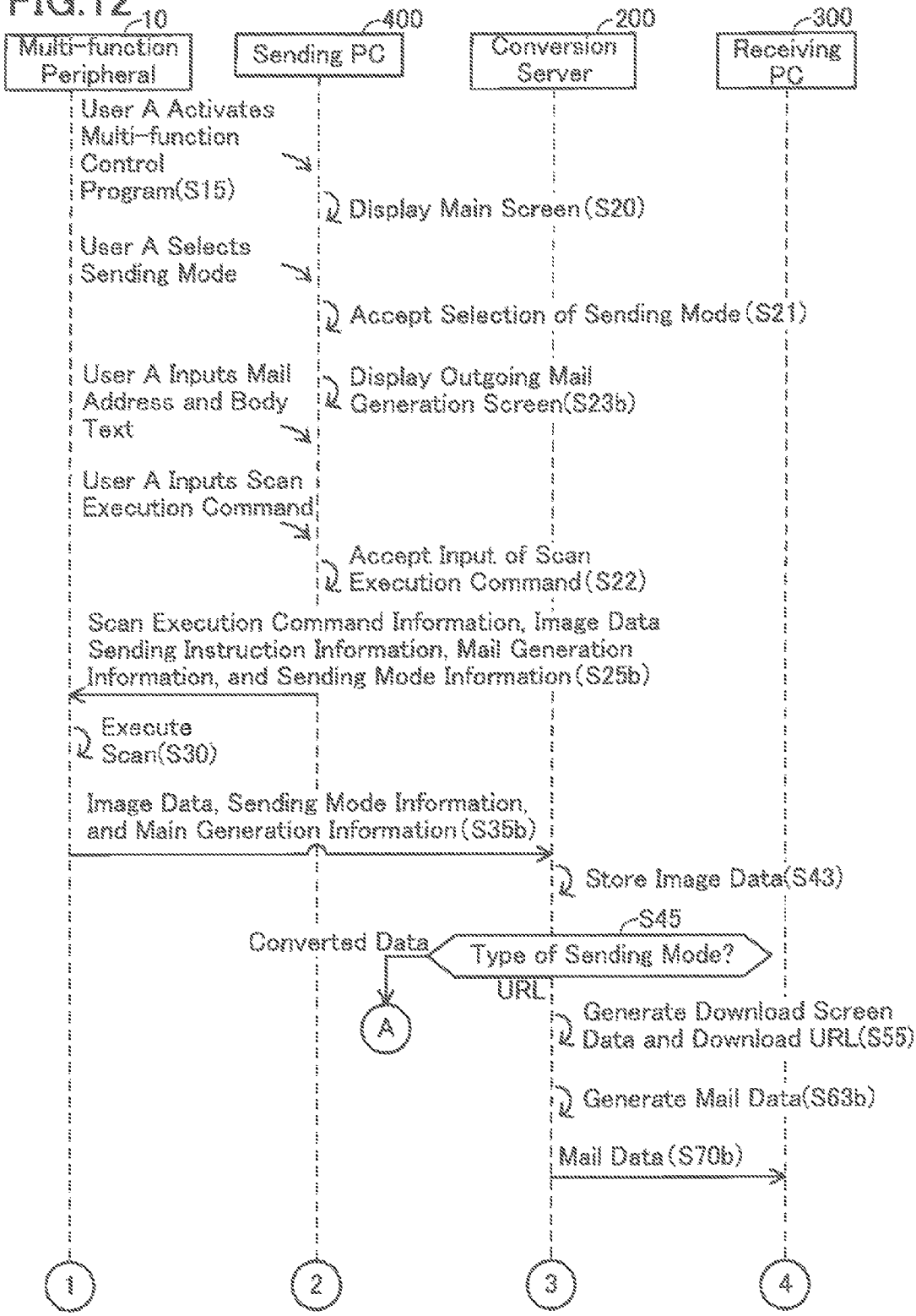

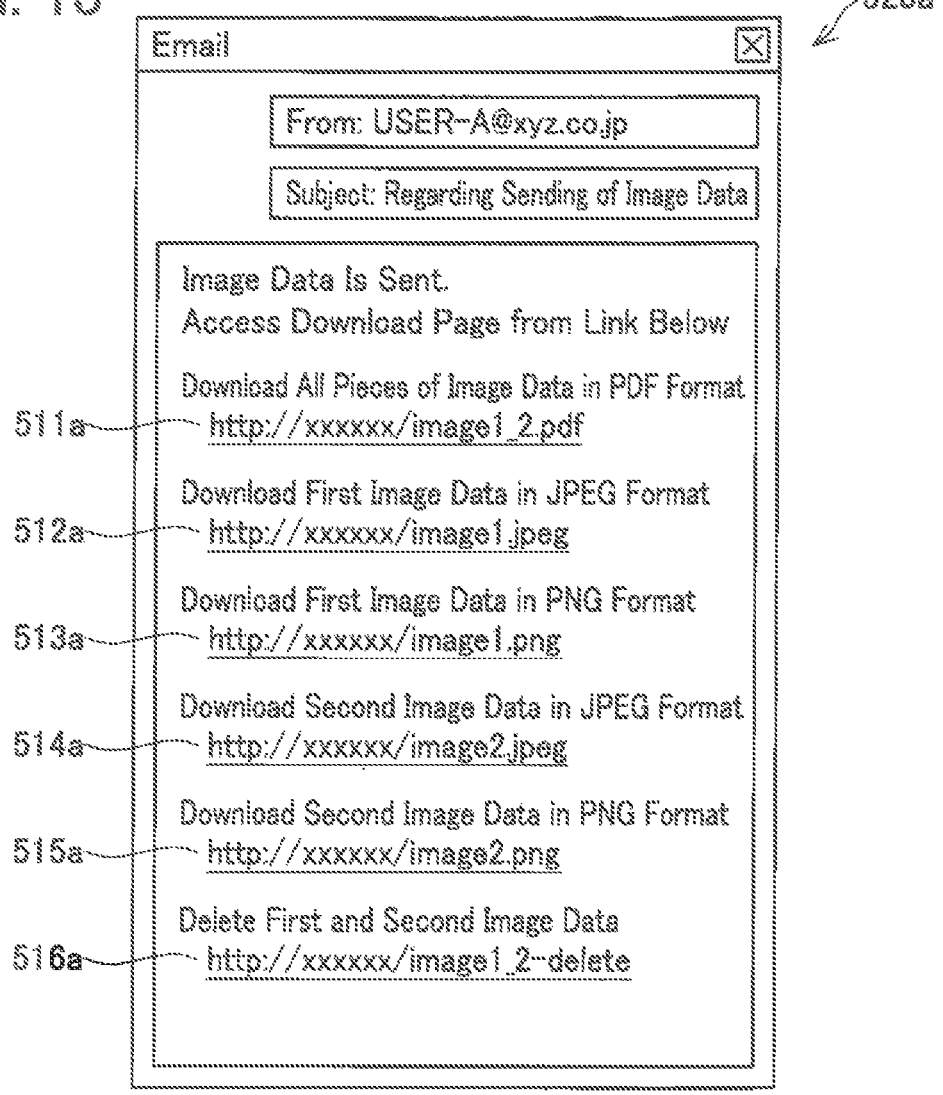

CONVERSION DEVICE CONFIGURED TO SEND CONVERSION DEVICE ACCESS INFORMATION TO INFORMATION PROCESSING DEVICE IN ORDER TO CAUSE INFORMATION PROCESSING DEVICE TO RECEIVE CONVERTED DATA

CROSS-REFERENCE TO RELATED APPLICATION

This application claims priority to Japanese Patent Application No. 2013-243873, filed on Nov. 26, 2013, the contents of which are hereby incorporated by reference into the present application.

TECHNICAL FIELD

The present specification discloses a conversion device, an image processing device, and an information processing device that are connected via a network.

DESCRIPTION OF RELATED ART

A known image processing device has a web browser installed therein, and has a function for downloading and printing a web page. Further, the image processing device has a function for generating image data by scanning a document, converting the image data to a predetermined format such as a Joint Photographic Experts Group (referred to as JPEG) format, and sending generated scan data to a web server.

SUMMARY

The aforementioned technology requires a receiving device side to have a web server function for receiving image data sent at timings convenient to a sending side, regardless of the convenience of the receiving side. This specification discloses a new technology for converting data outputted from an image processing device and then causing a specific information processing device to receive the data thus converted.

In one aspect of the teachings disclosed herein, a conversion device may be provided. The conversion device may comprise: a network interface configured to connect with a network, through which the conversion device communicates with an image processing device, a first information processing device, and a second information processing device; a processor coupled to the network interface; and a memory storing computer-readable instructions. The instructions, when executed by the processor, may cause the conversion device to perform receiving first data via the network interface, and storing the received first data in the memory. The first data may be generated in the image processing device. The instructions may cause the conversion device to perform sending conversion device access information via the network interface to the first information processing device, the second information processing device, or the image processing device. The conversion device access information may be to be used for accessing the conversion device via the network, and may be sent so that message information including the conversion device access information is to be sent to the first information processing device. The sending of the conversion device access information to the first information processing device may be performed based on first address information. The first address information may be associated with the first data, may be received via the network interface from the image processing device or the second information processing device, and may be to be used for sending various types of information to the first information processing device via the network interface. The various types of information may be associated with the first data. The sending of the conversion device access information to the second information processing device may be performed based on first address information. The second information processing device may be a sender that had sent the first data to the conversion device, so that the message information is sent to the first information processing device from the second information processing device. The sending of the conversion device access information to the image processing device may be performed based on first address information. The image processing device may be a sender that had sent the first data to the conversion device in the sending of the first data, so that the message information is sent to the first information processing device from the image processing device. The instructions may cause the conversion device to perform sending second data to the first information processing device via the network interface, when first information is received after the sending of the conversion device access information was performed. The second data may be converted from the first data.

BRIEF DESCRIPTION OF THE DRAWINGS

FIG. 11 shows a sequence diagram of various processing executed by each device;

FIG. 12 shows a sequence diagram of various processing executed by each device; and FIG. 13 shows an example of an incoming mail screen display.

EMBODIMENT (First Embodiment)(System Configuration)

Figure 1:
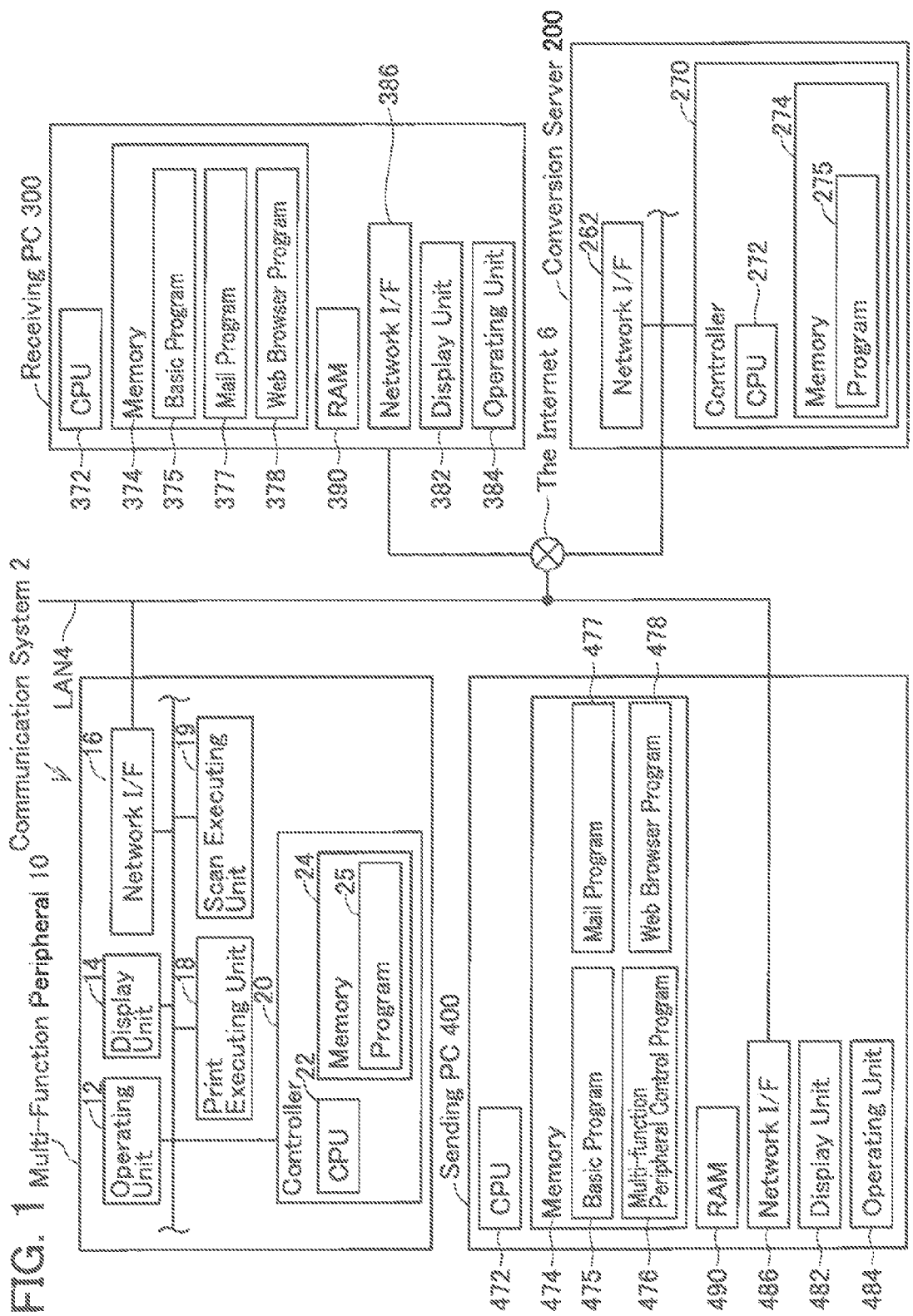
FIG. 1 shows the configuration of a communication system.

As shown in FIG. 1, a communication system 2 includes a multi-function peripheral 10, a conversion server 200, a receiving PC 300, and a sending PC 400. The multi-function peripheral 10 and the sending PC 400 are communicably connected with each other via a LAN 4. Further, the multi-function peripheral 10, the conversion server 200, the receiving PC 300, and the sending PC 400 are configured to communicate with one another by being connected with the Internet 6.

The multi-function peripheral 10, the conversion server 200, the receiving PC 300, and the sending PC 400 perform communication, for example, according to HyperText Transfer Protocol (also referred to as "HTTP") or HyperText Transfer Protocol Secure (also referred to as "HTTPS").

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of the Conversion Server 200)

The conversion server 200 may be a server which is provided by a vendor of the multi-function peripheral 10. The conversion server 200 comprises a network interface 262 and a controller 270. The controller 270 comprises a CPU 272 and memory 274. The memory 274 stores a program 275. The CPU 272 executes various processing according to the program 275. As with the memory 24, the memory 274 may be a computer readable storage medium.

The conversion server 200 is a server for executing a conversion process on various types of data. The conversion process is a process in which the data format of data uploaded to the conversion server 200 is converted into converted data having another data format. Examples of data formats that can be handled by the conversion process include JPEG, PNG, PDF, the bitmap format, TIFF, a text data format, HTML, Rich Text Format (also referred to as "RTF"), a word-processing software format, a spreadsheet software format, a presentation software format, etc. For example, in the case of conversion from the JPEG format into the word-processing software format, character recognition may be performed using an Optical Character Reader (also referred to as "OCR") function. This allows the conversion server 200 to execute the OCR function when the sending PC 400 has no OCR function, thus offering greater convenience for users.

Some notes on the description herein will be provided. The description "the CPU 272 of the conversion server 200 receives various types of information" herein includes technical contents of "the CPU 272 of the conversion server 200 receiving various types of information via the network interface 262". Further, the description "the CPU 272 of the conversion server 200 sends various types of information" herein includes technical contents of "the CPU 272 of the conversion server 200 sending various types of information via the network interface 262". Notably, the same applies to the CPU 22 and the network interface 16 of the Multi-function peripheral 10, the CPU 472 and the network interface 486 of the sending PC 400.

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data". For example, as long as the device treats this as information indicating that the number of print copies is two parts, data of the text format "COPY=2", and data of the binary format "10" is the same information. Note, however, that the distinction between the words "data" and "information" is not strict and exceptional treatment is permitted.

(Structures of the Sending PC 400 and the Receiving PC 300)

The structure of the sending PC 400 is described. The sending PC 400 includes a CPU 472, a memory 474, a display unit 482, an operating unit 484, a network interface 486, a RAM 490, etc. The display unit 482 can display various pieces of information. The operating unit 484 is constituted by a keyboard and a mouse. A user can input various instructions and various pieces of information to the sending PC 400 by operating the operating unit 484. The network interface 486 is connected with the Internet 6. The memory 474 stores a basic program 475, a multi-function peripheral control program 476, a mail program 477, and a web browser program 478. The basic program 475 is a program for controlling basic operation of the sending PC 400. The multi-function peripheral control program 476 is a program for controlling the various functions of the multi-function peripheral 10 from the sending PC 400. The mail program 477 is a program for sending and receiving emails and for generating emails. The web browser program 478 is a program for viewing web pages. It should be noted that the configuration of the CPU 372 to the RAM 390 of the receiving PC 300 is similar to the configuration of the CPU 472 to the RAM 490 of the sending PC 400, and as such, is not described here in detail.

(Operation of the Communication System)

Operation of the communication system 2 in the first embodiment is described with reference to sequence diagrams shown in FIGS. 2 to 4. In an initial state of the communication system 2, the respective CPUs of the multi-function peripheral 10, of the conversion server 200, of the receiving PC 300, and of the sending PC 400 are operating in accordance with programs stored in the respective devices. This makes it possible to handle input to an operating unit or a network I/F. Further, communication between the multi-function peripheral 10 and the sending PC 400 is performed via the LAN 4. Communication among the conversion server 200, the receiving PC 300, and the sending PC 400 is performed via the Internet 6.

In the example described in the present embodiment, it is assumed that User A is a user of the sending PC 400 and User B is a user of the receiving PC 300. Further, it is also assumed that User A uses the multi-function peripheral 10 to execute a scan process to generate image data, convert the image data thus generated, and then send, to User B, the image data thus converted. Further, it is also assumed that two documents are scanned in the scan process.

Figure 6:
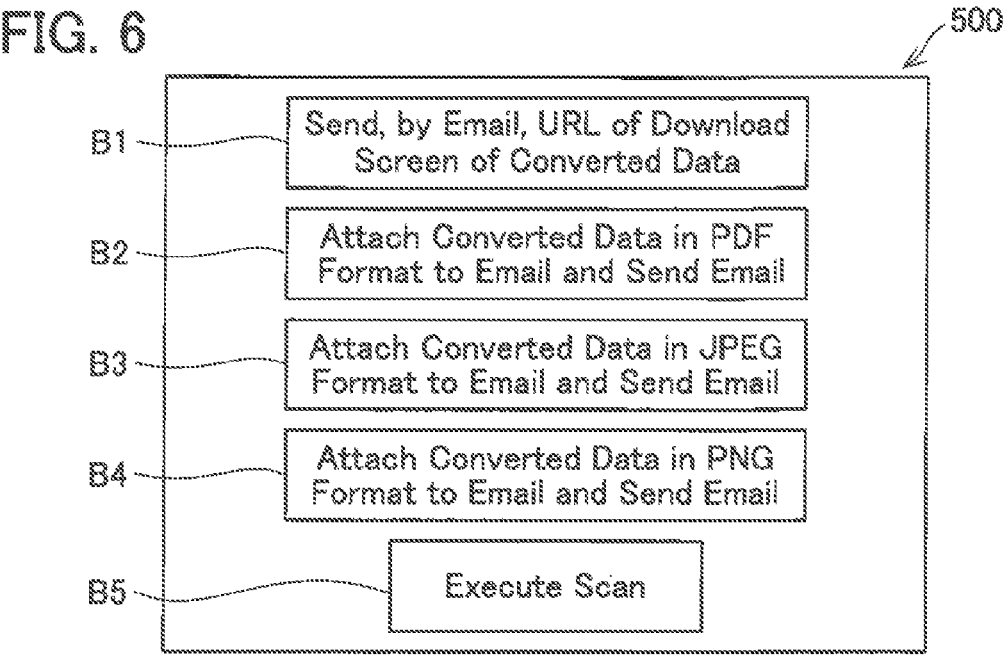
FIG. 6 shows an example of a main screen display.

In step S15, User A operates the operating unit 484 of the sending PC 400 to activate the multi-function peripheral control program 476. Further, User A inputs a command to execute a process of generating image data and sending it by email. In response to accepting the input of the command, the CPU 472 of the sending PC 400 causes the display unit 14 in step S20 to display a main screen. FIG. 6 shows an example of a main screen 500. The main screen 500 is a screen for accepting input of a command to execute a converted data sending function. The converted data sending function is a function for executing a process of uploading image data to the conversion server 200 and causing the conversion server 200 to convert the image data into converted data, and of sending the converted data or information for accessing the converted data to a desired destination by email.

The main screen 500 displays button images B1 to B5. Each of the button images B1 to B4 is a button image for selecting a sending mode. The image button B1 is an image for accepting selection of a URL sending mode. The URL sending mode is a mode of sending, to a destination, an email containing a URL for accessing the converted data. Each of the button images B2 to B4 is an image for accepting selection of a converted data sending mode. The converted data sending mode is a mode of sending, to a destination, an email to which the converted data has been attached. The button image B2 is an image for accepting input of an instruction to attach the converted data in PDF format to an email. The button image B3 is an image for accepting input of an instruction to attach the converted data in JPEG format to an email. The button image B4 is an image for accepting input of an instruction to attach the converted data in PNG format to an email. The image button B5 is a button image for accepting a command to cause the multi-function peripheral 10 to execute a scan process to cause the multi-function peripheral 10 to generate image data.

When User A executes an operation of selecting any one of the button images B1 to B4, the CPU 472 proceeds to step S21, in which it accepts the selection of the sending mode by User A. Further, when User A executes an operation of selecting the button image B5, the CPU 472 proceeds to step S22, in which it accepts input of a scan execution command by User A. In step S25, the CPU 472 sends scan execution command information to the multi-function peripheral 10.

In step S30, the CPU 22 of the multi-function peripheral 10 executes scanning of an image. Specifically, the CPU 22 generates image data by causing the scan executing unit 19 to read a document placed on a document feeding device (not illustrated). In the example described in the present embodiment, as mentioned above, it is assumed that first and second image data are generated by scanning two documents. In step S35, the CPU 22 sends the first and second image data to the sending PC 400.

In step S37, the CPU 472 of the sending PC 400 receives the first and second image data. Then, the CPU 472 causes the display unit 482 to display images formed by the first and second image data. In step S40, the CPU 472 sends sender identification information, the first and second image data received in step S37, sending mode information, a mail address of User A, who is the user of the sending PC 400, to the conversion server 200. The sender identification information is information for identifying a sender of the first and second image data. Examples of the sender identification information include a user ID of User A, an IP address of the sending PC 400, etc. The sending mode information is information indicating the sending mode selected by User A in step S21. The sending mode information, which was sent together with the first and second image data, is in a state of having been sent in association with the first and second image data. The mail address of User A may be stored in advance in the memory 474. Then, the CPU 472 may read the mail address of User A from the memory 474 and send it to the conversion server 200.

In step S43, the CPU 272 stores the first and second image data thus received in the memory 274 in association with the sender identification information, storage time and date information, and image data identification information. The storage time and date information is information indicating the date and time on and at which the first and second image data were stored. The image data identification information is information for identifying the first and second image data. Examples of the image data identification information include file names of the first and second image data.

Examples of a method for storing the first and second image data in association with the sender identification information and the like include a method that involves the use of a path indicating an area in the memory 274 in which the first and second image data are stored. For example, the first image data may be stored using such a path as "¥user ID of User A¥storage time and date information¥file name of first image data.bmp". This allows the sender identification information and the storage time and date information to be associated with the first image data stored under the file name "¥ file name of first image data.bmp".

Further, the first and second image data are stored in the memory 274 in such a data format as to be able to be converted directly into any other data format. For example, the first and second image data may be stored in the bitmap format, which is an uncompressed data format.

In step S45, the CPU 272 determines the type of the sending mode selected by User A. This determination may be made on the basis of the sending mode information received in step S40. In a case that the URL sending mode has been selected by User A (S45: URL), the CPU 272 proceeds to step S55. In step S55, the CPU 272 generates download screen data and a download URL. Further, the CPU 272 stores, in the memory 274, the download screen data thus generated. The download screen data is data for displaying a download screen for accepting selection as to which type of conversion process to execute. The download URL is information that is used for accessing, via the Internet 6, the download screen data stored in the memory 274. In step S60, the CPU 272 sends the download URL to the sending PC 400.

Figure 7:
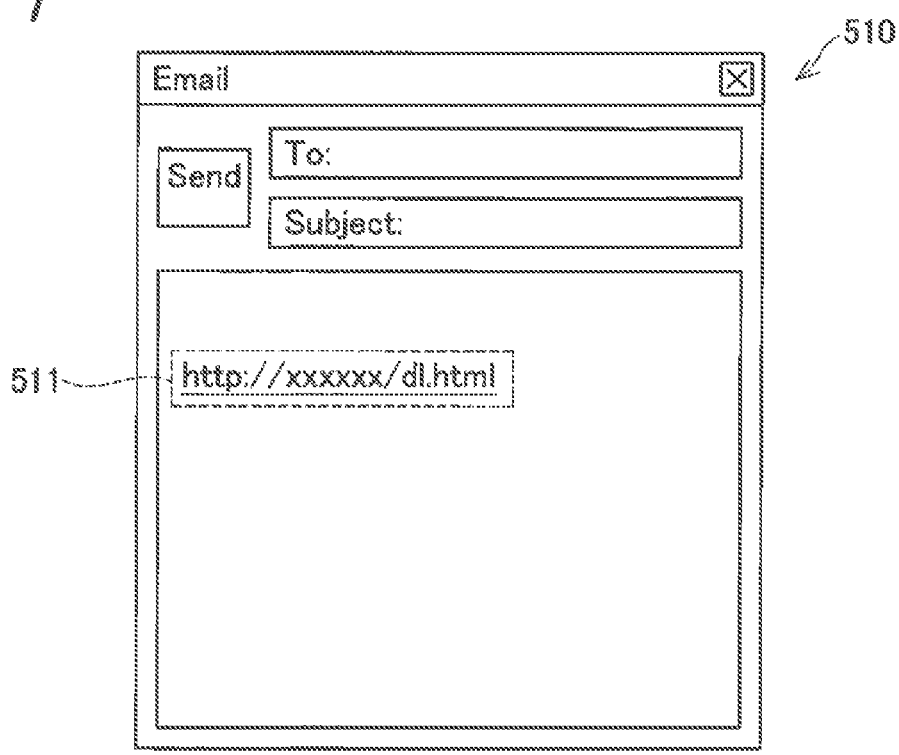
FIG. 7 shows an example of an outgoing mail generation screen display.

In step S65, the CPU 472 of the sending PC 400 activates the mail program 477. Then, the CPU 472 causes the display unit 482 to display an outgoing mail generation screen for generating mail data. FIG. 7 shows an example of an outgoing mail generation screen 510. The outgoing mail generation screen 510 has a body text generation field in which a download URL 511 sent from the sending PC 400 in step S60 is displayed in advance. The download URL 511 may be displayed in the form of a hyperlink on the outgoing mail generation screen 510.

Figure 8:
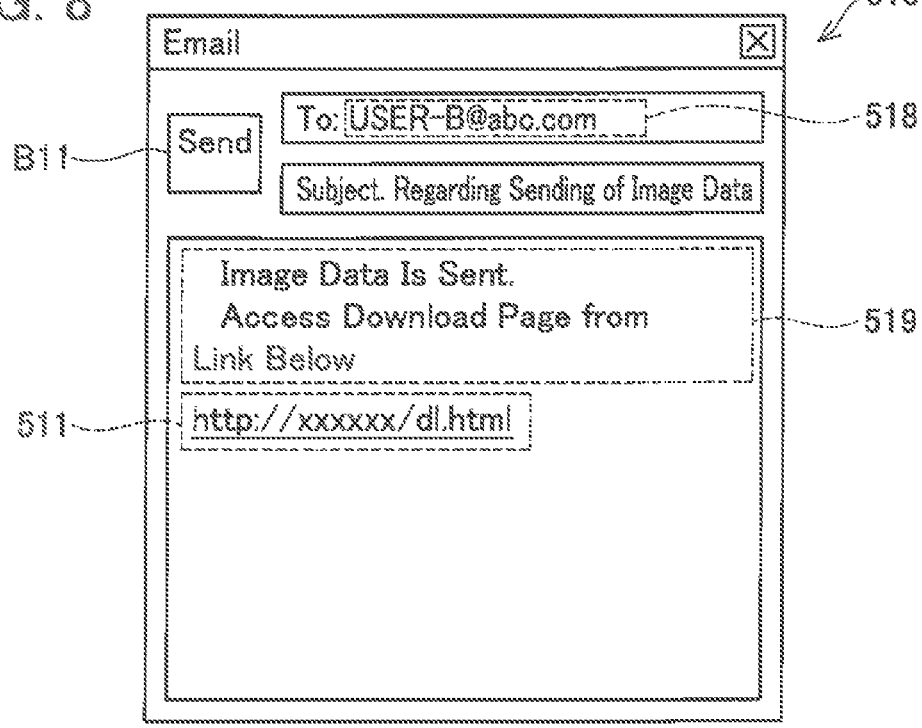
FIG. 8 shows an example of an outgoing mail generation screen display.

As shown in FIG. 8, User A uses the outgoing mail generation screen 510 to input a destination mail address 518 to which the converted data is sent and a mail body text 519. In the example described in the present embodiment, a mail address of User B is inputted as the destination mail address 518.

When User A selects a send button image B11 in the outgoing mail generation screen 510, the CPU 472 proceeds to step S70, in which it sends mail data reflecting the content of the input to the outgoing mail generation screen 510 toward the receiving PC 300, which User B uses.

In step S73, the CPU 372 of the receiving PC 300 receives the mail data. When User B operates the operating unit 384 to activate the mail program 377 to open the email thus received, the CPU 372 proceeds to step S75, in which it causes the display unit 382 to display an incoming mail screen on the basis of the mail data.

Figure 9:
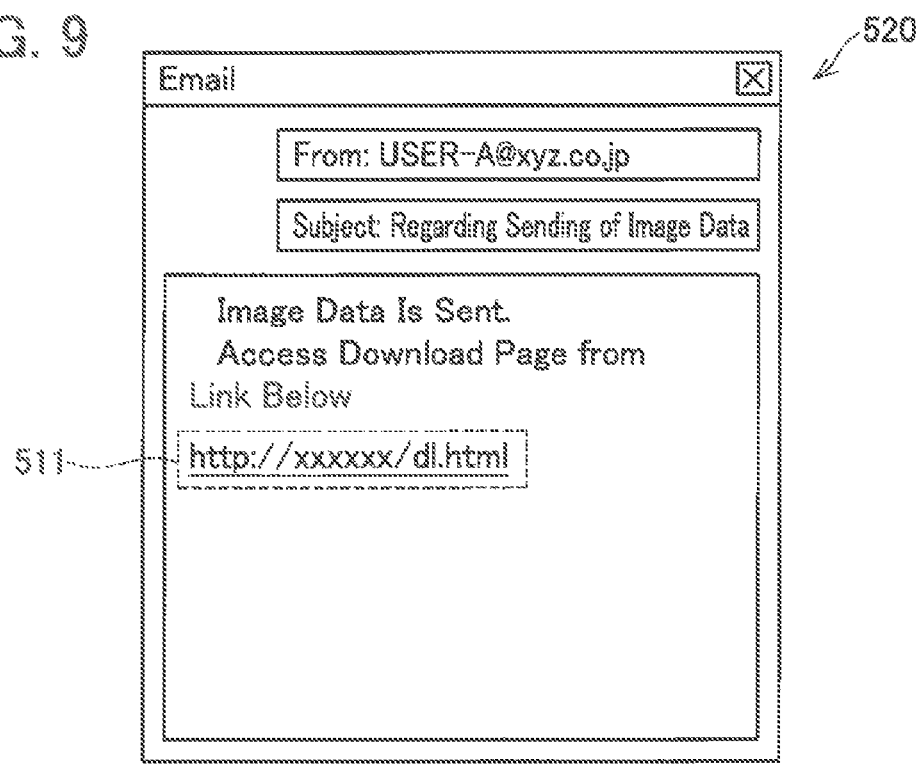
FIG. 9 shows an example of an incoming mail screen display.

FIG. 9 shows an example of an incoming mail screen 520. The incoming mail screen 520 displays the download URL 511. That is, the incoming mail screen 520 functions as an instruction acceptance screen for accepting input of an instruction to cause a download screen to be displayed.

User B operates the operating unit 384 to select the download URL 511. The selection operation may be performed by placing the cursor on the download URL 511 and clicking Once the download URL 511 is selected, the CPU 372 proceeds to step S80, in which it sends download screen data request information to the conversion server 200, which is a destination of access designated by the download URL 511. The download screen data request information is information for requesting the destination of access to send download screen data to the receiving PC 300.

In step S83, the CPU 272 of the conversion server 200 reads out, from the memory 274, the download screen data identified by the download screen data request information. In step S85, the CPU 272 sends the download screen data thus read out to the receiving PC 300.

Figure 10:
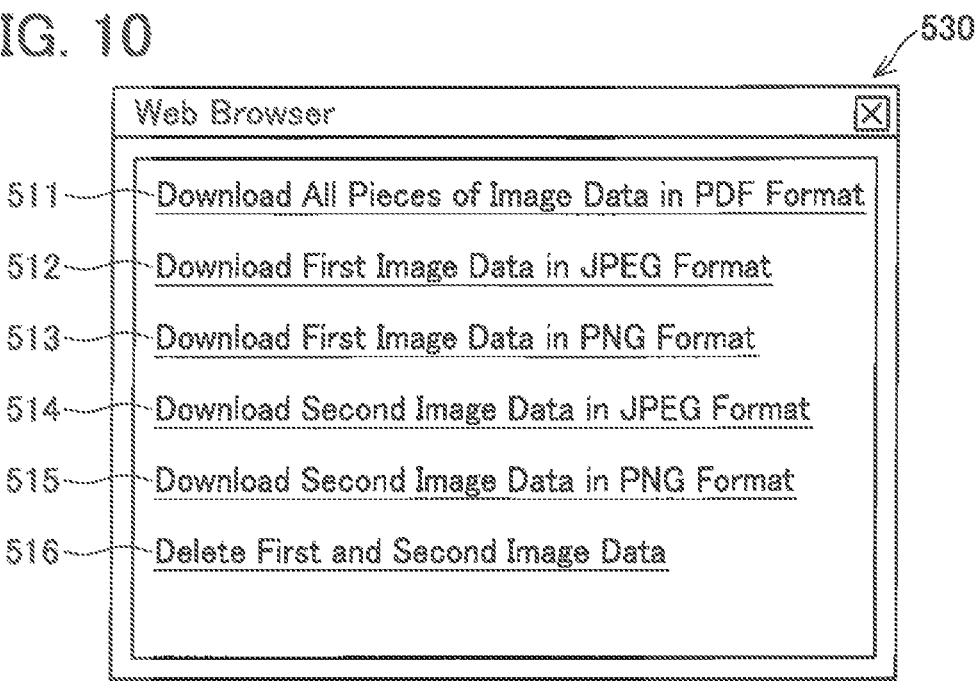
FIG. 10 shows an example of a download screen display.

In step S90, the CPU 372 activates the web browser program 378. Then, the CPU 372 causes a download screen to be displayed on a web browser on the basis of the download screen data thus received. FIG. 10 shows an example of a download screen 530. The download screen 530 displays link images 511 to 516. Each of the link images 511 to 515 is an image for accepting selection of a download mode. The link image 511 is an image for accepting execution of a download mode of converting the first and second image data into the PDF format and then downloading the first and second image data. In a case that the link image 511 has been selected, a conversion process is executed on the first and second image data. Then, as the conversion process is executed, a single piece of converted data in PDF format that contains two pages is generated. It should be noted that the concept that the conversion process "is executed" encompasses the completion of such execution and the start of such execution. The link image 512 is an image for accepting execution of a download mode of converting the first image data into the JPEG format and then downloading the first image data. In a case that the link image 512 has been selected, a conversion process is executed on the first image data. Then, as the conversion process is executed, a single piece of converted data in JPEG format is generated. The link image 513 is an image for accepting execution of a download mode of converting the first image data into the PNG format and then downloading the first image data. In a case that the link image 513 has been selected, a conversion process is executed on the first image data, so that a single piece of converted data in PNG format is generated. The link image 514 is an image for accepting execution of a download mode of converting the second image data into the JPEG format and then downloading the second image data. The link image 515 is an image for accepting execution of a download mode of converting the second image data into the PNG format and then downloading the second image data. The link image 516 is an image for accepting a data erasure command to erase the first and second image data stored in the conversion server 200. The link images 511 to 515 may be displayed in the form of hyperlinks.

In step S93, the CPU 372 accepts selection of a link image by User B. The selection operation may be performed by placing the cursor on any of the link images 511 to 516 and clicking Once any one of the link images 511 to 516 is selected, the CPU 372 proceeds to step S95, in which it sends download mode information to the conversion server 200. The download mode information is information indicating the download mode selected by User B.

In step S100, the CPU 272 of the conversion server 200 determines whether the process of downloading the converted data or the process of erasing the data was selected by User B. This determination may be made on the basis of the download mode information received in step S95. In a case that the process of downloading the converted data was selected (S100: Download), the CPU 272 proceeds to step S105.

In step S105, the CPU 272 reads out, from the memory 274, image data identified by the download mode information.

Then, the CPU 272 executes a conversion process of converting the image data thus read out into the data format designated by the download mode information. For example, in a case that the link image 511 was selected in step S93, the CPU 272 reads out the first and second image data from the memory 274 and executes a conversion process on the first and second image data, thereby generating a single piece of converted data in PDF format.

In step S110, the CPU 272 sends the converted data thus generated to the receiving PC 300. Then, the flow ends.

On the other hand, in a case that the CPU 272 determines, in step S100, that the process of erasing the data was selected by User B (S100: Erase), the CPU 272 proceeds to step S120. In step S120, the CPU 272 erases the first and second image data from the memory 274. Then, the flow ends.

Figure 2:
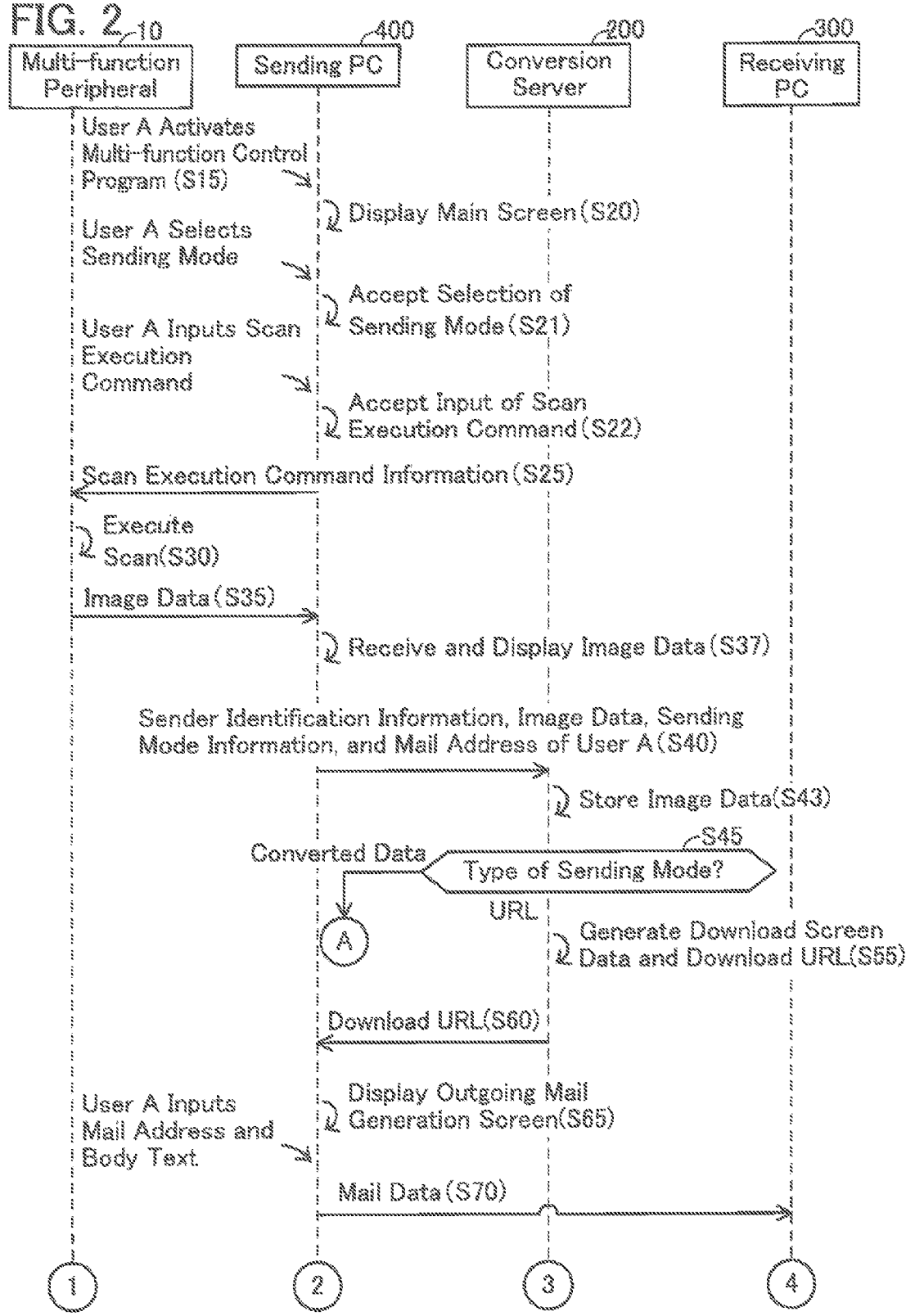
FIG. 2 shows a sequence diagram of various processing executed by each device.

Further, in a case that the CPU 272 determines, in step S45 of FIG. 2, that the URL sending mode was selected by User A, (S45: Converted Data), the CPU 272 proceeds to step S155 of FIG. 4. In step S155, the CPU 272 of the conversion server 200 executes a conversion process of converting the first and second image data received in step S40 into the data format designated by the sending mode information. For example, in a case that the button image B3 (see FIG. 6) was selected by User A in step S22, the CPU 272 reads out the first and second image data from the memory 274 and executes a conversion process on the first and second image data, thereby generating two pieces of converted data in JPEG format.

In step S160, the CPU 272 sends the converted data thus generated to the sending PC 400. Further, in step S163, the CPU 272 erases the first and second image data, on which the conversion process was executed in step S155, from the memory 274.

In response to receiving the converted data in step S160, the CPU 472 of the sending PC 400 proceeds to step S165, in which it activates the mail program 477. Then, the CPU 472 causes the display unit 482 to display an outgoing mail generating screen for generating mail data. To the mail data, the converted data received may be attached in a default state. User A uses the outgoing mail generation screen 510 to input a destination mail address to which the converted data is sent and a mail body text. In the example described in the present embodiment, the mail address of User B is inputted as the destination mail address.

When User A selects a send button image in the outgoing mail generation screen, the CPU 472 proceeds to step S170, in which it sends mail data toward the receiving PC 300, which User B uses. The mail data has the converted data attached thereto as an attached file, the converted data can be sent to the receiving PC 300. Then, the flow ends.

Figure 5:
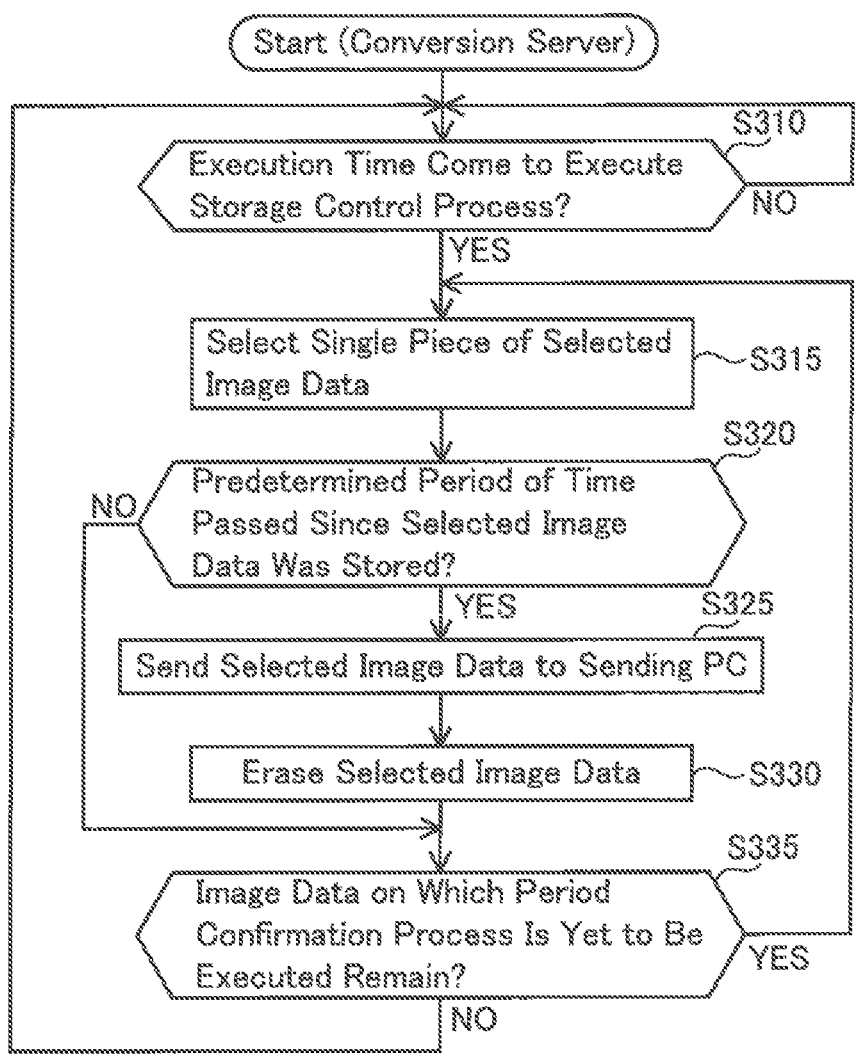
FIG. 5 shows a flow chart of a process for controlling the storage of image data.

A process that is performed in the conversion server 200 for controlling the storage of image data is described with reference to a flow chart shown in FIG. 5. The process for controlling the storage of image data is a process in which of plural pieces of image data stored in the memory 274 of the conversion server 200, a piece of image data having been stored for a predetermined period of time is erased from the memory 274.

In step S310, the CPU 272 determines whether or not execution time has come to execute the storage control process. The execution time may be determined in advance by an administrator of the conversion server 200 or the like and may for example be every hour on the hour. When the determination is negative (S310: NO), the CPU 272 returns to step S310. When the determination is positive (S310: YES), the CPU 272 proceeds to step S315.

In step S315, the CPU 272 selects, as selected image data, one of the plural pieces of image data stored in the memory 274.

In step S320, the CPU 272 executes a period confirmation process of determining whether or not a predetermined period of time has passed since the selected image data was stored in the memory 274. The predetermined period of time may be determined in advance by the administrator of the conversion server 200 or the like and may for example be one week. The determination in step S320 may be made, for example, by making a comparison between storage date and time information indicating the time at which the selected image data was stored in the memory 274 and the current date and time. The storage date and time information may be specified, for example, by using information described in the path to the image data. When the determination is negative (S320: NO), the CPU 272 proceeds to step S335. When the determination is positive (S320: YES), the CPU 272 proceeds to step S325.

In step S325, the CPU 272 sends the selected image data to the sending PC 400. Specifically, the CPU 272 sends, to the mail address of User A as received in step S40, an email to which the selected image data has been attached.

In step S330, the CPU 272 erases the selected image data from the memory 274. In step S335, the CPU 272 determines whether or not image data on which the period confirmation process is yet to be executed remains in the memory 274. When the determination is positive (S335: YES), the CPU 272 returns to step S315, in which it executes the period confirmation process on the next image data. Alternatively, when the determination is negative (S335: NO), the CPU 272 returns to step S310.

(Effects of the First Embodiment)

The first embodiment makes it possible to store image data outputted from the multi-function peripheral 10 in the memory 274 of the conversion server 200 (S43). Further, the first embodiment makes it possible to cause the receiving PC 300 to obtain converted data into which the image data has been converted (S110). This allows User B of the receiving PC 300 to obtain the converted data at a timing convenient to User B.

The image data can be stored in the bitmap format in the memory 274 (S43). The bitmap format is a data format that can be converted directly into any other data format (S105). Therefore, by storing only unconverted image data in bitmap format in advance in the memory 274 and performing a conversion process (S105) in response to receiving download mode information designating the data format of converted data (S95), the first embodiment makes it possible to generate converted data in any of the various data formats and send it to the receiving PC 300 (S110). This makes it possible to compress the amount of data that is stored in a storage unit, as compared with a case that converted data converted into each of the plural types of data format is stored in advance in the memory 274.

User A of the sending PC 400 can send mail data containing a download URL to the receiving PC 300, which User B uses (S70). User B can use the download URL to cause the receiving PC 300 to display a download screen (S90). The download screen displays link images for selecting any of the various data formats such as the PDF format and the JPEG format (see FIG. 10). This allows User B of the receiving PC 300 to execute selection as to in what data format to generate converted data (S93). This also allows User B to, at a timing convenient to User B, confirm an email and select the data format of the converted data.

Image data outputted (S35) from the multi-function peripheral 10 can be sent to the conversion server 200 via the sending PC 400 (S40). This makes it possible to confirm, at the sending PC 400, an image formed by the image data (S37).

Image data having been stored in the memory 274 of the conversion server 200 for more than a predetermined period of time can be sent back to the sending PC 400 (S320: YES, S325). This makes it possible to erase the image data having been stored in the memory 274 of the conversion server 200 for more than the predetermined period of time from the storage unit (S330), thus making it possible to compress the amount of data that is stored in the memory 274. This also makes it possible to prevent image data from staying in the storage unit. This also makes it possible for User A of the sending PC 400 to again execute a series of processes for causing User B of the receiving PC 300 to obtain converted data.

The first embodiment allows User A of the sending PC 400 to select which sending mode to use from among the URL sending mode and the converted data sending mode (S21). That is, the first embodiment allows User B to obtain converted data on the basis of a mail format designated in advance by User A. This makes it possible to widen the range of selection of how to send converted data.

(Second Embodiment)

Operation of the communication system 2 in the second embodiment is described with reference to a sequence diagram shown in FIG. 11. It should be noted that the sequence diagram shown in FIG. 11 is one obtained by modifying part of the sequence diagram shown in FIG. 2 according to the first embodiment. Those steps in FIG. 11 and FIG. 2 which are given the same reference signs are identical in content to each other, and as such, are not described here.

In step S25a, the CPU 472 of the sending PC 400 sends image data sending instruction information and sending mode information, as well as the scan execution command information, to the multi-function peripheral 10. The image data sending instruction information is information for instructing the multi-function peripheral 10 to send image data generated in the multi-function peripheral 10 to the conversion server 200. The image data sending instruction information may contain information for accessing the conversion server 200 (e.g. the IP address of the conversion server 200). The content of the sending mode information has already been described in step S40, and as such, is not described here.

In step S35a, the CPU 22 of the multi-function peripheral 10 sends image data and the sending mode information received in step S25a to the conversion server 200. The multi-function peripheral 10 and the conversion server 200 may communicate with each other via the Internet 6. In step S45, the CPU 272 determines, on the basis of the sending mode information sent in step S35a, the sending mode selected by User A.

In step S60a, the CPU 272 sends a download URL to the multi-function peripheral 10. In step S63a, the CPU 22 of the multi-function peripheral 10 transfers the download URL received in step S60a to the sending PC 400. Step S65 and the subsequent steps have already been described in the first embodiment, and as such, are not described here.

(Effects of the Second Embodiment)

The operation of the communication system 2 according to the second embodiment makes it possible to send image data directly from the multi-function peripheral 10 to the conversion server 200 (S35a). This eliminates the need to relay the image data between the multi-function peripheral 10 and the conversion server 200, thus making it possible to reduce the processing load on the sending PC 400.

In the case of causing the sending PC 400 to obtain a download URL from the conversion server 200 (S60), the communication is executed via the Internet 6. In this case, a security function such as a fire wall may work to cause the sending PC 400 to fail to obtain the download URL. The operation of the communication system 2 according to the second embodiment allows the sending PC 400 to obtain the download URL from the multi-function peripheral 10 (S63*a*). In this case, since the communication is executed via the LAN 4, the security can be better enhanced than in the case that the communication is performed via the Internet 6. This can prevent the security function from working, thus allowing the sending PC 400 to surely obtain the download URL.

(Third Embodiment)

Operation of the communication system 2 in the third embodiment is described with reference to a sequence diagram shown in FIG. 12. It should be noted that the sequence diagram shown in FIG. 12 is one obtained by modifying part of the sequence diagram shown in FIG. 2 according to the first embodiment. Those steps in FIG. 12 and FIG. 2 which are given the same reference signs are identical in content to each other, and as such, are not described here.

In step S23*b*, the CPU 472 of the sending PC 400 activates the mail program 477. Then, the CPU 472 causes the display unit 482 to display an outgoing mail generation screen for generating mail data. User A uses the outgoing mail generation screen 510 to input a destination mail address to which the converted data is sent and a mail body text.

When User A inputs a scan execution command, the CPU 472 proceeds to step S25*b*, in which it sends scan execution command information, image data sending instruction information, mail generation information, and sending mode information to the multi-function peripheral 10. The image data sending instruction information is information for instructing the multi-function peripheral 10 to send image data generated in the multi-function peripheral 10 to the conversion server 200. The mail generation information is information containing various types of information necessary for generating mail data in the conversion server 200. The mail generation information may for example contain information indicating the destination mail address and the mail body text whose input was accepted in step S23*b*.

In step S35*b*, the CPU 22 of the multi-function peripheral 10 sends image data, the sending mode information received in step S25*b*, and the mail generation information received in step S25*b* to the conversion server 200.

In step S63*b*, the CPU 272 of the conversion server 200 generates mail data on the basis of the mail generation information. The mail data thus generated contains the destination mail address and the mail body text whose input was accepted in step S23*b* and the download URL generated in step S55. In step 70*b*, the CPU 272 sends the mail data toward the receiving PC 300, which User B uses. The subsequent steps have already been described in the first embodiment, and as such, are not described here.

(Effects of the Third Embodiment)

The communication system 2 according to the third embodiment can cause the conversion server 200 to generate mail data (S63*b*) and cause the conversion server 200 to send the mail data thus generated to the receiving PC 300 (S70*b*). This eliminates the need for User A of the sending PC 400 to send the mail data to the receiving PC 300, thus making it possible to enhance user convenience. Further, the third embodiment makes it possible to accept, at any timing, an operation of User A using the outgoing mail generating screen to input the mail address and the like (S23*b*). Therefore, the acceptance of selection of a sending mode by User A (S21) and the acceptance of input of the mail address and the like (S23*b*) can be performed at the same time. This makes it possible to reduce the number of times User A operates the sending PC 400.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(Modifications)

Figure 3:
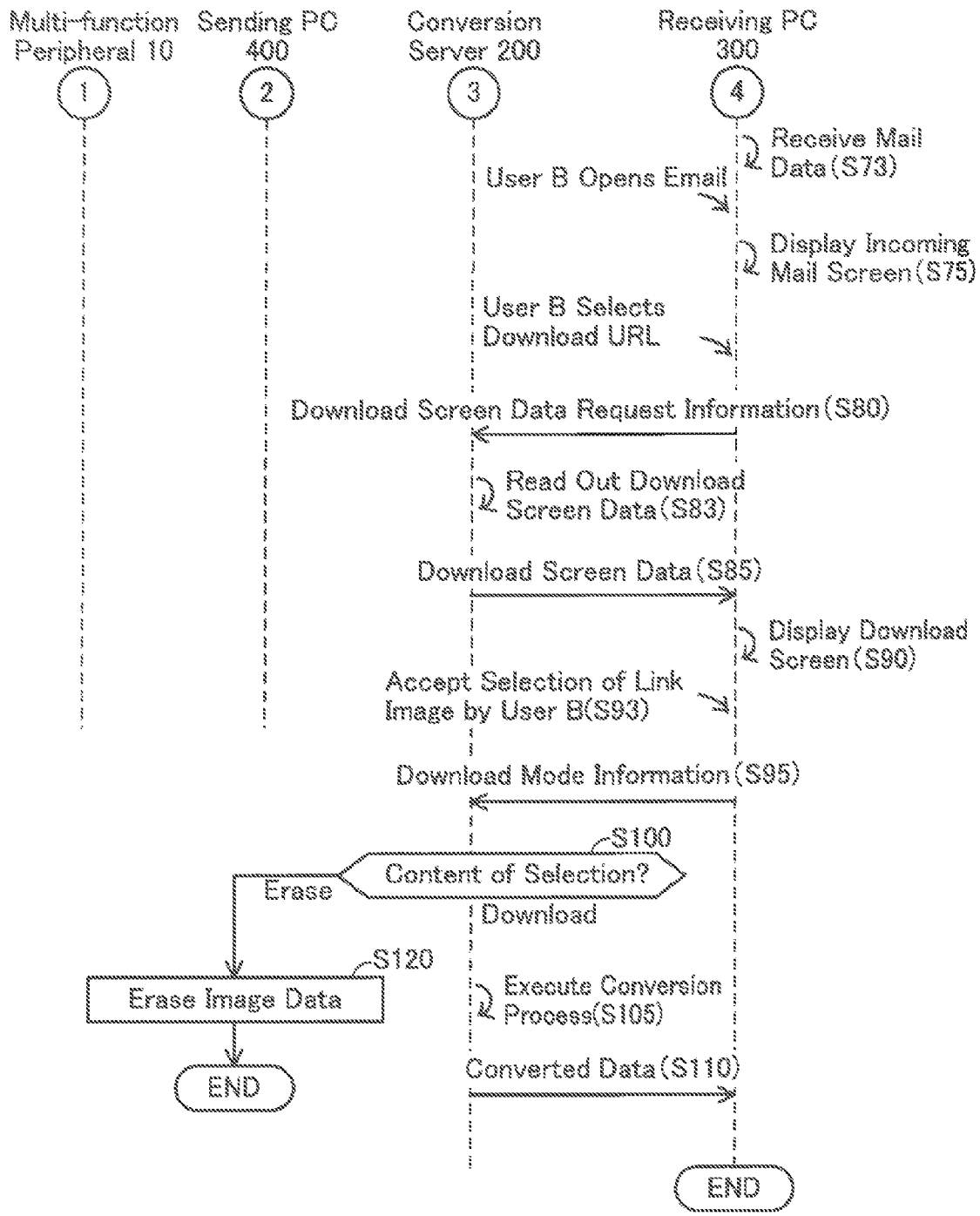
FIG. 3 shows a sequence diagram of various processing executed by each device.
Figure 4:
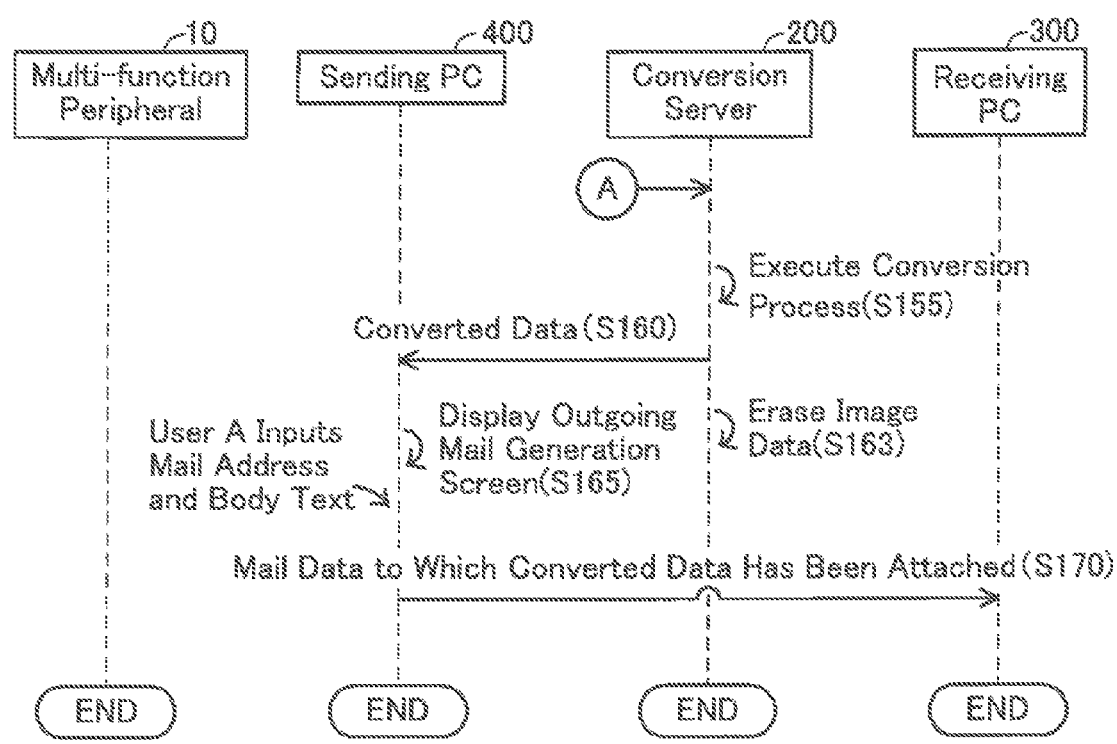
FIG. 4 shows a sequence diagram of various processing executed by each device.

In step S75 of FIG. 3, the incoming mail screen displayed by the display unit 382 of the receiving PC 300 may display an image for accepting selection of a download mode. FIG. 13 shows an example of an incoming mail screen 520*a*. The incoming mail screen 520*a* displays link images 511*a* to 516*a*. The contents of the link images 511*a* to 516*a* are identical to the contents of the link images 511 to 516, and as such, are not described here. In order to achieve this configuration, the CPU 272 may, in step S55 of FIG. 2, generate a download URL that is used for displaying the link images 511*a* to 516*a*. In step S65, the CPU 472 may cause the link images 511*a* to 516*a* to be displayed in advance in the body text generation field of the outgoing mail generation screen. Further, steps S80 to S90 may be omitted from the flow chart shown in FIG. 3 so that the CPU 372 of the receiving PC 300 proceeds from step S75 to step S93. When, in step S93, User B selects a link image, the CPU 372 may proceed to step S95, in which it sends download mode information to the conversion server 200. This makes it possible to omit the process in which the receiving PC 300 activates the web browser program 378 and causes a download screen to be displayed (S90). This eliminates the need for User B to cause a download screen to be displayed, thus making it possible to enhance convenience.

The download screen 530 of FIG. 10 may be configured to display only a link image that accepts a download in a data format designated by User A. This configuration may be achieved by allowing User A to execute selection of a usable data format that is a data format which can be used as a data format of converted data. The acceptance of selection of a usable data format may be executed together with the acceptance of selection of a sending mode executed in step S21. Further, the sending mode information may contain information indicating a usable data format. In step S55, the CPU 272 may generate download screen data for displaying a download screen for accepting only a process of conversion into a usable data format. For example, in a case that the PDF format and the JPEG format are selected as usable data formats, the download screen 530 of FIG. 10 may be configured to display only the link images 511, 512, 514, and 516. This allows User A of the sending PC 400 to designate a data format of converted data that User B of the receiving PC 300 is allowed to obtain. Similarly, the incoming mail screen 520*a* of FIG. 13 may be configured to display only a link image that accepts a download in a data format designated by User A. In this case, the CPU 272 may, in step S55, generate only a download URL that is used for displaying a link image for accepting a process of conversion into a usable data format.

In step S325, the selected image data may be sent to the receiving PC 300, which is a destination of the converted data. This configuration may be achieved by storing the mail address of User B of the receiving PC 300 in advance in the conversion server 200. For example, the acceptance of input of the mail address of User B may be executed together with the acceptance of selection of a sending mode executed in step S21. Further, the sending mode information may contain the mail address of User B. In step S43, the CPU 272 may store the mail address of User B in the memory 274 in association with image data. This makes it possible to erase image data having been stored for more than a predetermined period of time from the storage unit (S330), thus making it possible to compress the amount of data that is stored in the memory 274.

In step S325, the selected image data, which is sent to the sending PC 400 or the receiving PC 300, may be any of the various types of data, e.g. the converted data. For example, in a case that the usable data format which can be used as the data format of the converted data is determined to be a single specific usable data format, the converted data may be sent in step S325. Examples of the case that the specific usable data format is determined include a case that the specifications under which there exists only one specific usable data format and a case that a specific usable data format has been designated by User A. In a case that the URL sending mode has been selected by User A (S45: URL), the CPU 272 may convert the image data temporarily stored in the memory 274 in step S43 into converted data in the specific usable data format before proceeding to step S55. After that, the CPU 272 may erase the image data temporarily stored in the memory 274. In step S55, the CPU 272 may generate download screen data and a download URL. In this case, the download screen that is displayed on the basis of the download screen data does not have to display an image for accepting selection as to into what data format to execute a process of conversion. Further, in step S55, the CPU 272 may generate a download URL that is used for displaying link images on the incoming mail screen. In this case, a link image that accepts execution of a process of downloading image data in a specific usable data format and a link image for accepting a command to erase converted data stored in the conversion server 200 may be displayed on the incoming mail screen. It should be noted that the concept of "causing first data outputted from the image processing device to be stored in the storage unit" encompasses (1) causing image data received in step S40 to be stored in the memory 274 until a conversion process is executed in step S105 and (2) causing image data received in step S40 to be stored in the memory 274 to be converted into converted data in a specific usable data format before the CPU 272 proceeds to step S55.

In a case that the CPU 272 determines, in step S320, that the predetermined period of time has passed since the selected image data was stored in the memory 274 (S320: YES), the CPU 472 may wait for access to the conversion server 200 from the device from which the selected image data was sent to the conversion server 200 (i.e. the sending PC 400). An example of the access from the sending PC 400 is an HTTP request requesting access. In response to the access from the sending PC 400, the conversion server 200 may send the selected image data to the sending PC 400. The sending of the selected image data to the sending PC 400 may be executed, for example, as a HTTP response. This makes it possible to send the selected image data to the sending PC 400 even in a case that the mail address of User A of the sending PC 400 is unknown. Further, since the selected image data can be sent to the sending PC 400 as a response to the access request from the sending PC 400, the sending of the selected image data will not be inhibited by a security function such as a fire wall.

In the operation of the third embodiment, mail data may be generated by the multi-function peripheral 10. In this case, the CPU 272 of the conversion server 200 may, in step S55 of FIG. 12, send the download URL to the multi-function peripheral 10. In response to receiving the download URL, the multi-function peripheral 10 may generate mail data and send the mail data thus generated to the receiving PC 300. This makes it possible to reduce the processing load on the conversion server 200.

The download mode information that is sent to the conversion server 200 in step S95 contains the information indicating the download mode selected by User B. Therefore, the download mode information functions both as conversion instruction information that instructs into what data format to execute a process of conversion and request information that requests the converted data from the conversion server 200. Alternatively, the download mode information does not have to contain the information indicating the download mode selected by User B. In this case, the download mode information may function as information that requests the converted data from the conversion server 200 without designating a data format.

The download screen data request information that is sent to the conversion server 200 in step S80 may function as request information that requests the converted data from the conversion server 200.

In step S40 of FIG. 2, step S35a of FIG. 11, step S35b of FIG. 12, etc., the method employed for associating various types of information such as sending mode information with image data is, but is not limited to, a method for sending and receiving the image data and the various types of information together in a single round of communication. For example, in a case that the image data and the various types of information are sent and received through a series of plural rounds of communication performed after the scan execution command information is outputted (S25, S25a, S25b), the image data and the various types of information may be associated with each other. Further, the image data and the various types of information may be associated with each other by adding identification information of the image data (e.g., the file name of the image data) to the various types of information.

The process of displaying images formed by the first and second image data (S37) may be omitted. For this reason, generally speaking, the conversion server 200 needs only include the "receiving of first data", the "sending of conversion device access information", and the "sending of second data". As a specific example, the conversion server 200 needs only execute at least steps S35a, S35b, S40, S70b, S60, S60a, and S110.

In the present embodiment, it is assumed that two documents are scanned in the scan process. However, the present embodiment is not limited to this configuration. The advantages of the present technology are obtained even in a case that one or three or more documents are scanned.

In the present embodiment, a case in which one set including two documents is scanned, is explained. However, the present embodiment is not limited to this configuration. For example, two sets; i.e. a first set of scan target and a second set of scan target, may be scanned as well. The first and second sets of scan target may include a plurality of documents. In this case, the download screen 530 (see FIG. 10) displayed in step S90 may be configured to display a first link image and a second link image. The first link image is an image for accepting execution of converting plural pieces of image data generated by scanning the first set of scan target into the PDF format and then downloading the plural pieces of the image data. The second link is an image for accepting execution of converting plural pieces of image data generated by scanning the second set of scan target into the PDF format and then downloading the plural pieces of the image data.

A plurality of multi-function peripherals, a plurality of sending PCs, and a plurality of receiving PCs may be connected with the Internet 6.

While the multi-function peripheral 10 was explained as an example of the image processing apparatus, the configuration is not limited thereto. The configuration may also adopt a sewing machine that performs stitching or quilting of a pre-determined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner generates data indicating the shape or movement of an object based on the output from a sensor. As an example of image data, moving image data or 3D image data may be used.

In the embodiment, the case is described in which the CPUs 22, 272, 372 and 472 of the multi-function peripheral 10, the conversion server 200, the receiving PC 300, and the sending PC 400 execute processing according to software, but is not limited thereto. At least a part of functions provided according to the software may be provided by hardware such as a logic circuit.

The invention claimed is:

1. A conversion device comprising:
    a network interface configured to connect with a network, through which the conversion device communicates with an image processing device, a first information processing device, and a second information processing device;
    a processor coupled to the network interface; and
    a memory storing computer-readable instructions which, when executed by the processor, cause the conversion device to perform:
    receiving first data via the network interface, and storing the received first data in the memory,
        the first data being generated in the image processing device;
    sending conversion device access information,
        wherein the conversion device access information is to be used for accessing the conversion device via the network, and is sent so that message information including the conversion device access information is to be sent to the first information processing device; and
    sending second data to the first information processing device via the network interface, when first information is received after the sending of the conversion device access information was performed,
        wherein the second data is converted from the first data.

2. The conversion device according to claim 1, wherein the computer-readable instructions are further configured to cause the conversion device to perform:
    performing a conversion process on the first data stored in the memory to generate the second data when the first information is received, and
    the sending of the second data is performed by sending the second data generated by the conversion process.

3. The conversion device according to claim 2, wherein the computer-readable instructions are configured to perform a plurality of types of conversion processes,
    in the sending of the conversion device access information, information required for displaying a first screen, which is for receiving a selection on which of the conversion processes is to be performed, on a display of the first information processing device is sent as the conversion device access information,
    when conversion designation information designating which of the plurality of types of conversion processes is to be performed is received via the network interface from the first information processing device, the performing of the conversion process performs a conversion process designated by the received conversion designation information to generate the second data, and
    the sending of the second data is performed when the conversion designation information is received after the sending of the conversion device access information was performed.

4. The conversion device according to claim 3, wherein the computer-readable instructions are further configured to cause the conversion device to perform:
    sending second information to the first information processing device, the second information processing device, or the image processing device via the network interface,
        wherein the second information being for displaying an instruction receiving screen for receiving an instruction to display the first screen on the display of the first information processing device; and
    receiving display command information instructing to display the first screen from the first information processing device; and
    sending first screen data for displaying the first screen to the first information processing device via the network interface, when the receiving of the display command information is performed after the sending of the conversion device access information was performed.

5. The conversion device according to claim 3, wherein the first screen includes a first image and a second image,
    the first image is for receiving the selection of a first type of conversion process in which N pieces of second data are generated as a result of the first type of conversion process on N pages of the first data, where N is a natural number of 1 or more, and
    the second image is for receiving the selection of a second type of conversion process in which one piece of second data is generated as a result of the second type of conversion process on N pages of the first data.

6. The conversion device according to claim 3, wherein the sending of the conversion device access information is performed when conversion processing information instructing one or more of the plurality of types of conversion processes in association with the first data is received via the network interface,
    the first screen is for receiving an execution of one of the one or more conversion processes instructed by the conversion processing information.

7. The conversion device according to claim 1, wherein the computer-readable instructions are further configured to cause the conversion device to perform:
    receiving second address information of the second information processing device when the first data is received from the second information processing device, the second address information being information to be used for sending various types of information to the second information processing device via the network interface; and sending the first data or the second data stored in the memory to the second information processing device based on the received second address information, in case that a predetermined period of time has elapsed without the receiving of the first information taking place after the storing of the first data in the memory.

8. The conversion device according to claim 1, wherein when a predetermined period of time has elapsed without the receiving of the first information taking place after the storing of the first data in the memory, the computer-readable instructions are further configured to cause the conversion device to perform:

sending the first data or the second data stored in the memory to the second information processing device in case that request information requesting access from the second information processing device that had relayed the first data is received.

9. The conversion device according to claim 1, wherein the computer-readable instructions are further configured to cause the conversion device to perform:

receiving first address information of the first information processing device,
   wherein the first address information is associated with the first data, and is to be used for sending various types of information to the first information processing device via the network interface; and sending message information including the first data or the second data stored in the memory to the first information processing device based on the received first address information, in case that a predetermined period of time has elapsed without the receiving of the first information taking place after the storing of the first data in the memory.

10. The conversion device according to claim 1, wherein the computer-readable instructions are further configured to cause the conversion device to perform:

receiving sending mode information via the network interface,
   the sending mode information instructing which of the message information including the conversion device access information and message information including the second data is to be sent to the first information processing device, and
   the sending mode information being associated with the first data; and sending the second data to the second information processing device so that the message information including the second data to the first information processing device, when the received sending mode information is instructing to send the message information including the second data, and the sending of the conversion device access information is performed when the received sending mode information is instructing to send the message information including the conversion device access information.

11. The conversion device according to claim 1, wherein the sending of the conversion device access information includes sending the conversion device access information to the second information processing device, and the second information processing device is a sender that had sent the first data to the conversion device, so that the message information is sent to the first information processing device from the second information processing device.

12. The conversion device according to claim 1, wherein the sending of the conversion device access information includes sending the conversion device access information to the image processing device, and the image processing device is a sender that had sent the first data to the conversion device, so that the message information is sent to the first information processing device from the second information processing device.

13. The conversion device according to claim 1, wherein the sending of the conversion device access information includes sending the message information including the conversion device access information to the first information processing device based on first address information, the first address information is associated with the first data, is received via the network interface from the image processing device, and is to be used for sending various types of information to the first information processing device via the network interface, and the various types of information are associated with the first data.

14. An information processing device comprising:
a network interface configured to connect with a network, through which the information processing device communicates with an image processing device, a conversion device and a communication terminal;
a processor coupled to the network interface; and
a memory storing computer-readable instructions which, when executed by the processor, cause the information processing device to perform:
   sending data generation command information instructing to generate first data to the image processing device via the network interface;
   performing a first process to cause the first data generated in the image processing device to be stored in the conversion device; and
   sending accessory information so that the message information is sent to the communication terminal, wherein
   the message information includes conversion device access information and the accessory information, and
   the conversion device access information is to be used for accessing the conversion device via the network and for receiving second data, which is converted from the first data, from the conversion device.

15. The information processing device according to claim 14, wherein
   in the first process, the computer-readable instructions cause the information processing device to perform:
   receiving the first data sent from the image processing device; and
   sending the received first data to the conversion device.

16. The information processing device according to claim 14, wherein
   in the first process, the computer-readable instructions cause the information processing device to perform:
   sending data sending command information to the image processing device via the network interface, the data sending command information instructing to send the first data generated in the image processing device to the conversion device.

17. The information processing device according to claim 14, wherein the sending of the accessory information includes sending the accessory information to the image processing device so that the accessory information is sent to the conversion device through the relay of the image processing device and that the message information is sent to the communication terminal.

18. The information processing device according to claim 14, wherein
the sending of the accessory information includes sending the message information directly to the communication terminal.

19. An image processing device comprising:
a network interface configured to connect with a network, through which the image processing device communicates with a first information processing device, a second information processing device, and a conversion device;
a processor coupled to the network interface; and
a memory storing computer-readable instructions which, when executed by the processor, cause the image processing device to perform:
generating first data;
sending the generated first data to the conversion device so that the first data is stored in the conversion device; and
sending conversion device access information to the second information processing device via the network interface so that message information including the conversion device access information is to be sent to the first information processing device from the second information processing device,
wherein the conversion device access information is to be used for accessing the conversion device via the network, and for receiving second data, which is converted from the first data, from the conversion device.

20. The image processing device according to claim 19, wherein
in the sending of the conversion device access information, the computer-readable instructions cause the image processing device to perform:
receiving the conversion device access information sent from the conversion device after the sending of the first data was performed; and
sending the received conversion device access information to the second information processing device so that the second information processing device can send the message information to the first information processing device.

* * * * *